(12) United States Patent
Hunton

(10) Patent No.: US 7,864,874 B2
(45) Date of Patent: Jan. 4, 2011

(54) OFDM COMMUNICATIONS SYSTEM EMPLOYING CREST FACTOR REDUCTION WITH ISI CONTROL

(75) Inventor: Matthew J. Hunton, Liberty Lake, WA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 968 days.

(21) Appl. No.: 11/521,028

(22) Filed: Sep. 14, 2006

(65) Prior Publication Data

US 2007/0058743 A1 Mar. 15, 2007

Related U.S. Application Data

(60) Provisional application No. 60/718,099, filed on Sep. 15, 2005.

(51) Int. Cl.
*H04L 27/28* (2006.01)
(52) U.S. Cl. .................. 375/260; 332/107; 332/123; 332/159; 332/162; 455/63.1; 455/114.2
(58) Field of Classification Search .................. 375/260, 375/285, 295, 296; 332/107, 123, 159, 162; 455/63.1, 114.2
See application file for complete search history.

(56) References Cited

U.S. PATENT DOCUMENTS 6,175,551 B1    1/2001  Awater et al.

| | | | |
|---|---|---|---|
| 2003/0086507 A1* | 5/2003 | Kim et al. | 375/297 |
| 2004/0090283 A1* | 5/2004 | Naito | 333/17.2 |
| 2004/0165524 A1* | 8/2004 | Chen et al. | 370/208 |
| 2005/0265479 A1* | 12/2005 | Fujii et al. | 375/303 |
| 2008/0019453 A1 | 1/2008 | Zhao et al. | |

FOREIGN PATENT DOCUMENTS

EP    1 168 748 A2    6/2001

OTHER PUBLICATIONS

IEEE VTS 53rd Vehicular Technology Conference, Spring 2001 Proceedings, Jean Armstrong, "New OFDM Peak-to-Average Power Reduction Scheme".

\* cited by examiner

*Primary Examiner*—Mohammad H Ghayour
*Assistant Examiner*—Leila Malek
(74) *Attorney, Agent, or Firm*—OC Patent Law Group

(57) ABSTRACT

A system and method for providing a peak power reduced OFDM communications signal are disclosed. The system and method provide peak reduction processing in the time domain followed by inter-symbol interference (ISI) control processing in the frequency domain to maintain modulation errors introduced by the peak reduction processing to an acceptable level. The processing is preferably done on a parallel signal path and the peak corrections with ISI control are added into the main signal path to provide the peak reduced OFDM signal.

13 Claims, 5 Drawing Sheets

OFDM COMMUNICATIONS SYSTEM EMPLOYING CREST FACTOR REDUCTION WITH ISI CONTROL

RELATED APPLICATION INFORMATION

The present application claims priority to provisional application Ser. No. 60/718,099 filed Sep. 15, 2005, the disclosure of which is incorporated herein by reference in its entirety.

FIELD OF THE INVENTION

The present invention relates to wireless communications systems. More particularly, the present invention relates to communications systems employing OFDM modulators.

BACKGROUND, PRIOR ART AND RELATED INFORMATION

Many modern wireless and cabled data communications systems use Orthogonal Frequency Division Modulation (OFDM). Given a fixed RF transmit bandwidth, OFDM has data bandwidth advantages over other modulation techniques. In OFDM, data bits are mapped into data symbols. A number of symbols are then grouped into a packet. Each symbol in a packet is then modulated onto a unique orthogonal carrier. The OFDM signal is therefore a sum of multiple carrier sinusoids. When combining multiple sinusoids, high peak power relative to average power is produced. Signals with a high peak-to-average ratio make signal amplification difficult. If peak power is compressed or clipped during amplification, two problems result. First, bandwidth of the transmitted signal increases causing interference in neighboring frequency channels. Signal bandwidth must meet limitations set by governmental regulatory bodies. Second, inter-symbol-interference (ISI) is induced into the modulation increasing link bit error rate.

All communication systems are designed to tolerate some degradation in modulation. However a need presently exists to reduce the peak-to-average ratio of an OFDM signal while controlling the amount of induced inter-symbol interference (ISI). If these two goals can be achieved both RF bandwidth and bit error rate limits can be met.

SUMMARY OF THE INVENTION

In a first aspect the present invention provides a method for peak power reduction of an OFDM wireless communications signal. The method comprises receiving an OFDM signal comprising plural symbols, splitting the QFDM signal along first and second parallel signal paths, and performing a peak reduction processing on the signal in the second signal path in the time domain to derive a peak reduction signal. The method further comprises converting the peak reduction signal into the frequency domain and performing a processing in the frequency domain to adjust the amount of inter-symbol interference introduced by the peak reduction processing to provide an inter-symbol interference adjusted peak reduction signal. The inter-symbol interference adjusted peak reduction signal is then combined with the signal on the first signal path to provide a peak power adjusted OFDM signal.

In a preferred embodiment of the method for peak power reduction of an OFDM wireless communications signal the peak reduction processing comprises clipping symbols above a threshold value and taking the difference between the clipped and unclipped symbols to derive the peak reduction signal. The signal provided on the second signal path by the splitting may comprise a frequency domain signal and the peak reduction processing further comprises converting the frequency domain signal to the time domain before clipping. Combining the inter-symbol interference adjusted peak reduction signal with the signal on the first signal path to provide a peak power adjusted OFDM signal preferably comprises subtracting the peak reduction signal from the signal on the first signal path. Performing a processing in the frequency domain to adjust the amount of inter-symbol interference preferably comprises converting the peak reduction signal from the time domain to the frequency domain and normalizing the magnitude of the peak reduction signal. Normalizing the magnitude of the peak reduction signal may be performed selectively on a symbol by symbol basis based on the magnitude of the peak reduction signal, wherein only symbols exceeding a predetermined value are normalized. Normalizing the magnitude of the peak correction on a symbol by symbol basis may then further comprise multiplying the normalized symbols by the predetermined value. Performing a processing in the frequency domain to adjust the amount of inter-symbol interference may further comprise multiplying the magnitude of the normalized peak reduction signal by a gain factor. The method may further comprise band limiting the inter-symbol interference adjusted peak reduction signal before combining the inter-symbol interference adjusted peak reduction signal with the signal on the first signal path.

In another aspect the present invention provides a method for providing a peak power reduced OFDM communications signal comprising receiving a modulated communications signal comprising a series of symbols, converting the symbols into parallel format in groups of M plural symbols, framing the parallel format symbols to create groups of N plural symbols, and performing a peak reduction processing on the framed symbols to derive a peak reduced set of N symbols. The peak reduction processing comprises performing a clipping operation in the time domain and an inter-symbol interference processing in the frequency domain to adjust the amount of inter-symbol interference introduced by the clipping operation. The method further comprises converting the peak reduced set of N symbols into the time domain, performing a cyclic extension operation on the time domain peak adjusted symbols, performing a windowing operation on the time domain peak adjusted symbols, and converting the time domain peak adjusted symbols from parallel to serial format to provide a peak power reduced digital OFDM communications signal.

In a preferred embodiment of the method for providing a peak power reduced OFDM communications signal, framing the parallel format symbols comprises placing zero valued symbols on either end of the set of M symbols to create a total of N symbols. Converting the peak reduced set of symbols into the time domain preferably comprises performing an inverse direct Fourier transform that converts the N symbols into the time domain. Performing a cyclic extension operation on the time domain peak adjusted symbols preferably comprises extending the length of the group of N symbols by adding some of the N symbols to the beginning or end of the group of symbols. The symbols comprising the modulated communications signal comprise a series of complex symbols modulated into a constellation pattern and the inter-symbol interference processing preferably maintains the constellation pattern within a predetermined degree of modulation accuracy.

In another aspect the present invention provides an improved OFDM communications system. The OFDM communications system comprises an input receiving a modulated communications signal comprising a series of symbols, a serial to parallel converter for converting the symbols into parallel format in groups of plural symbols, a framing circuit for framing the parallel format symbols to provide framed sets of symbols, and a crest factor reduction circuit comprising first and second parallel signal paths both receiving the framed sets of symbols. The second signal path includes a circuit for converting the framed sets of symbols into the time domain, a peak reduction circuit performing a peak reduction processing on the time domain symbols to derive sets of peak reduction symbols, a circuit for converting the peak reduction symbols into the frequency domain, and an inter-symbol interference control processing circuit operating on the frequency domain peak reduction symbols to adjust the amount of inter-symbol interference introduced by the peak reduction symbols to provide inter-symbol interference adjusted peak reduction symbols. The crest factor reduction circuit further comprises a combiner circuit for combining the inter-symbol interference adjusted peak reduction symbols with the symbols on the first signal path to provide peak reduced sets of symbols in the frequency domain. The OFDM communications system further comprises a circuit for converting the peak reduced sets of symbols into the time domain, a cyclic extension circuit for performing a cyclic extension operation on the time domain peak reduced symbols, a windowing circuit for performing a windowing operation on the time domain peak reduced symbols, and a parallel to serial converter for converting the time domain peak reduced symbols from parallel to serial format to provide a peak power reduced digital OFDM communications signal.

In a preferred embodiment of the OFDM communications system the circuit for converting the framed sets of symbols into the time domain and the circuit for converting the peak reduced sets of symbols into the time domain each comprise an inverse direct Fourier transform circuit block. The circuit for converting the peak reduction symbols into the frequency domain preferably comprises a direct Fourier transform circuit block. The inter-symbol interference control processing circuit preferably comprises a normalization circuit which adjusts the magnitude of the peak reduction symbols. The normalization circuit may adjust each peak reduction symbol in a set to the same magnitude. Alternatively, the normalization circuit may adjust each peak reduction symbol on a symbol by symbol basis based on symbol magnitude. The inter-symbol interference control processing circuit may further comprise a multiplier which multiplies the normalized peak reduction symbols by a constant gain factor.

Further features and advantages of the present invention are set out in the following detailed disclosure.

DETAILED DESCRIPTION OF THE INVENTION

Figure 1:
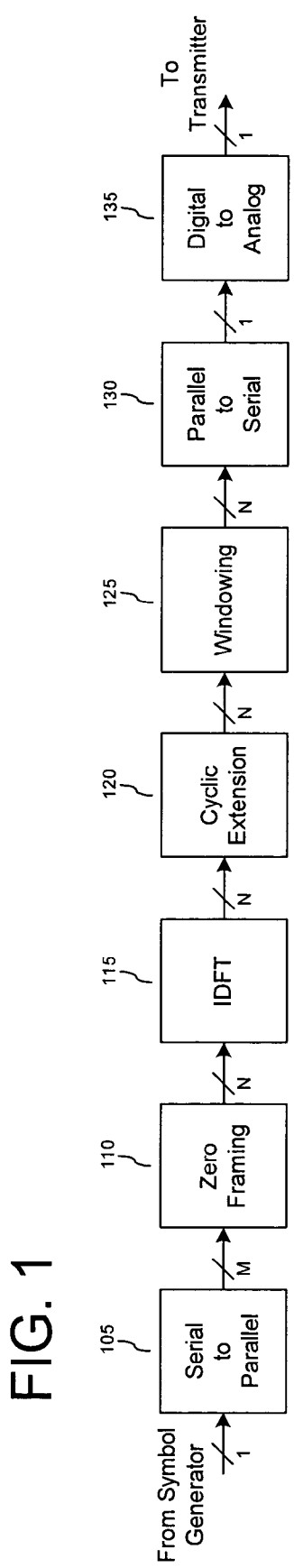
FIG. 1 shows a block diagram of a prior art OFDM transmitter.

FIG. 1 shows a block diagram of a prior art OFDM signal modulator coupled to a conventional transmitter. The modulator receives data symbols from a symbol generator. Symbol generators convert data bits into complex symbols representing more than one data bit. This conversion to symbols increases the data bandwidth of transmission. Commonly used symbol generators provide complex symbol constellations in BSK, QPSK, 16QAM, 32QAM, 64QAM, or other formats. Symbols enter the modulator on a serial line. An M length set of serial symbols is first converted (105) into parallel format. This M length set of symbols is then framed (110) in zero valued symbols. This framing (110) places zero valued symbols on either end of the parallel set of information symbols provided by the serial to parallel converter (105) creating a total of N symbols. Each symbol within the new N length set of symbols represents the amplitude and phase of an orthogonal carrier (frequency) for one burst of the OFDM transmission. The next processing step is an inverse direct Fourier transform (115) that converts the N symbols into the time domain. The purpose of zero framing (110) is to ensure that one or more full cycles are produced for each carrier associated with the original block of M symbols during inverse direct Fourier transform (IDFT) processing (Nyquist requirement). Additional zeros may be added to make the value of N equal to a power of two. Setting the length of N to a power of two permits the calculation of the IDFT (115) using a inverse fast Fourier transform (IFFT) algorithm. The IFFT algorithm is much more processor efficient in converting the signal from one domain to the other. The next processing step is to extend the OFDM burst by cyclic extension (120). As is well known to those skilled in the art, the time domain output from the IDFT (115) is circularly continuous. This means that the if the ends of the parallel data samples output from the IDFT (115) were connected to provide a loop, the amplitude and phase of the resulting signal would not be discontinuous at the connection. A signal created by playing the loop continuously would not include any discontinuity induced spectrum content. Cyclic extension (120) uses this to expand the play length of an OFDM burst. Primarily, this play length is expanded to aid in receiver demodulation when the transmitter to receiver link includes multipath. In a wireless air interface, multipath describes the reception of a transmit signal from direct and reflected paths. Since each signal path travels a different distance from the source, each path has a different delay. Cyclic extension (120) expands the length of the OFDM burst by at least the time difference between the direct and the longest significant time delay path. By expanding the burst length in this way, the OFDM signal receiver is able to remove the effect of multipath through equalization. Cyclic extension (120) is often shown as taking a segment of the time samples representing the start of the burst and placing them at the end of the burst. Cyclic extension (120) can however expand the burst length in either direction. After cyclic extension (120) the OFDM burst has abrupt signal amplitude discontinuities at the burst start and stop. Abrupt signal transitions produce discontinuity induced spectrum content. To avoid such spectrum content, the burst may be windowed (125) to provide a gradual transition from zero amplitude. Several different window types, known to those skilled in the art, may be used. Also filtering may be employed in some systems in place of such windowing as known to those skilled in the art. Often times the cyclic extension (120) time is increased over the requirement needed for multipath equalization to account for the windowing transition time. The parallel to serial converter (130) and digital to analog converter (135) shown in FIG. 1 are well known conventional circuit blocks. The analog output of the OFDM modulator is provided to a conventional analog transmitter (137), for example a cellular base station wireless transmitter, which may include an up converter, RF power amplifier, antenna and other well known conventional components.

Figure 2:
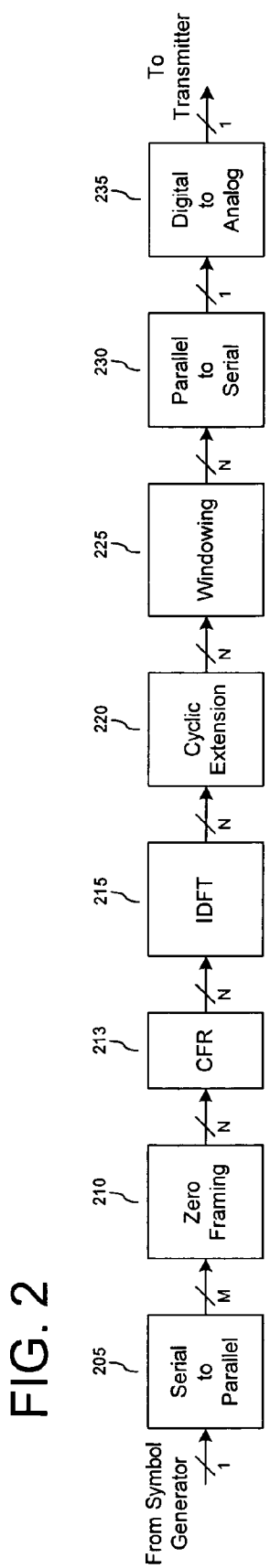
FIG. 2 shows a block diagram of the improved OFDM transmitter of the present invention where crest factor reduction (CFR) is added to an OFDM modulator.

FIG. 2 shows an improved OFDM transmitter in accordance with the present invention with the inclusion of a crest factor reduction processing block (CFR, 213). All the conventional steps described above may be employed in the present invention. CFR (213) processing accepts the N length set of zero framed symbols from the zero framing block (210) and produces an N length set of zero framed symbols to the IDFT block (215). By including CFR (213) in such a way, the present invention can be provided as a stand alone signal processing block for addition to a standard OFDM signal modulator, or as an overall improved OFDM modulator or improved OFDM based transmitter.

Figure 3:
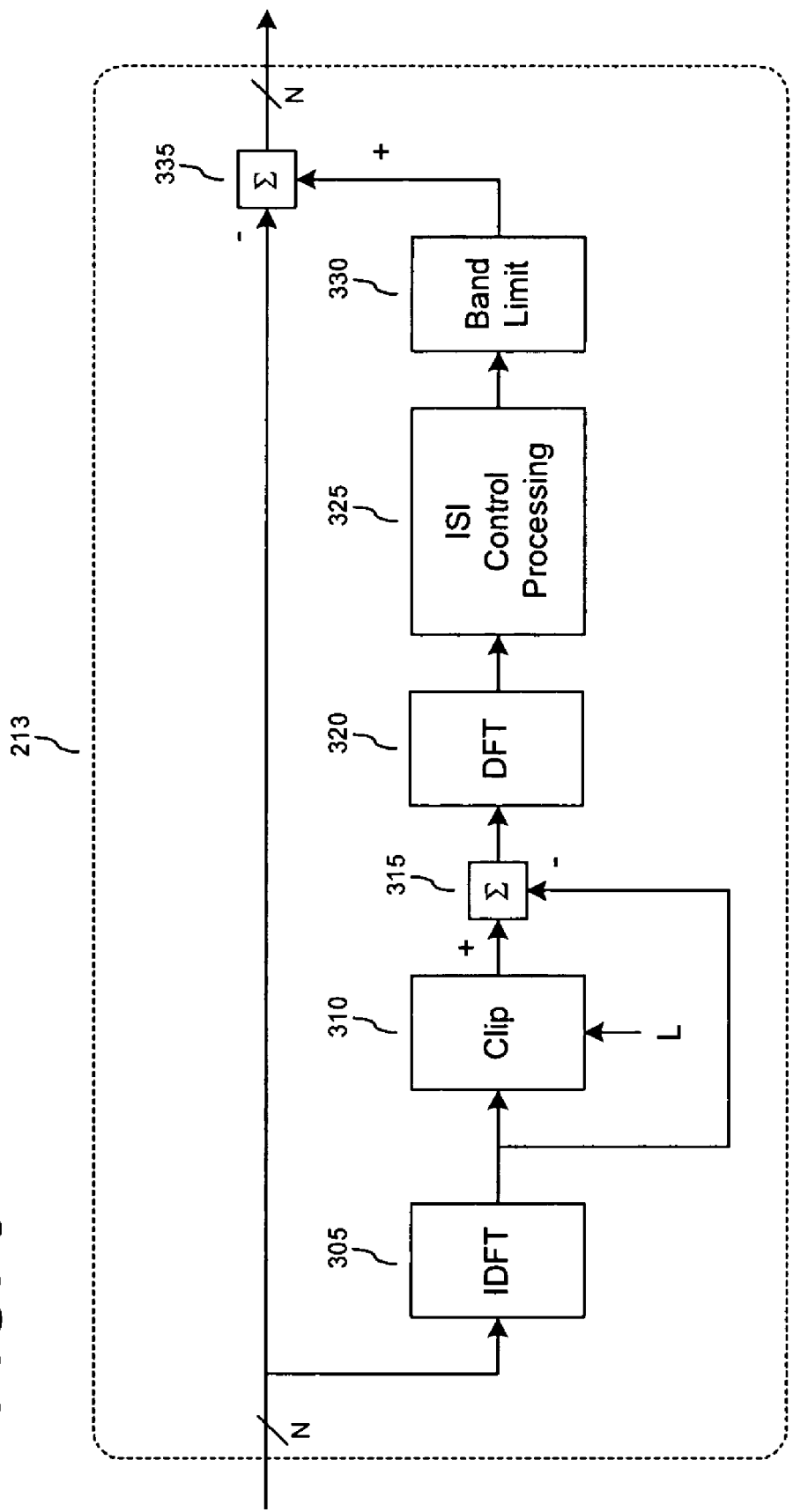
FIG. 3 shows a detailed implementation of the OFDM crest factor reduction signal processing block of FIG. 2.

FIG. 3 shows a block diagram of the internal processing provided by the CFR (213) processing block shown in FIG. 2. Each block within the CFR processor (213) operates on the input N length parallel data set. The CFR processor has two parallel paths. The first path proceeds from the input to the output with an addition node (335) for combining the signal processing of the second path. The assumption in this first path is that addition of the first and second paths occurs over the same N length data set regardless of the processing delay of the second path. The second path produces an N length set of symbols that are a function of symbols input to the CFR (213) processing block. By adding these functional symbols to the original set of input symbols, the peak power of the time domain signal produced by the IDFT (215, FIG. 2) in the OFDM modulator will be reduced. The second path of FIG. 3 begins with IDFT (305) to produce the full peak power time domain signal. The output of the IDFT (305) is amplitude clipped at clipping circuit block (310) to a user set level, L. This clipping clamps the time domain amplitude to no more than the level L, while preserving the phase of each time domain sample. A difference (315) is then taken between the output of the clipping block (310) and the original unclipped time domain signal. This difference signal is then converted back to the frequency domain in the Direct Fourier Transform (DFT) block (320). The output of the DFT block (320) is an N length set of symbols. This N length set of symbols is then ISI control processed (325) to limit the inter-symbol interference induced by CFR. An explanation of this processing will be described below. The ISI control processing block (325) output is an N length set of symbols. These symbols are then band limited at circuit block (330). This band limiting (330) is accomplished by setting to zero all symbols that correspond to the zero valued symbols added during zero framing (213, FIG. 2). With this final step accomplished, the second path symbols are combined (335) with the first path symbols producing the CFR (213) processing block output.

Figure 4:
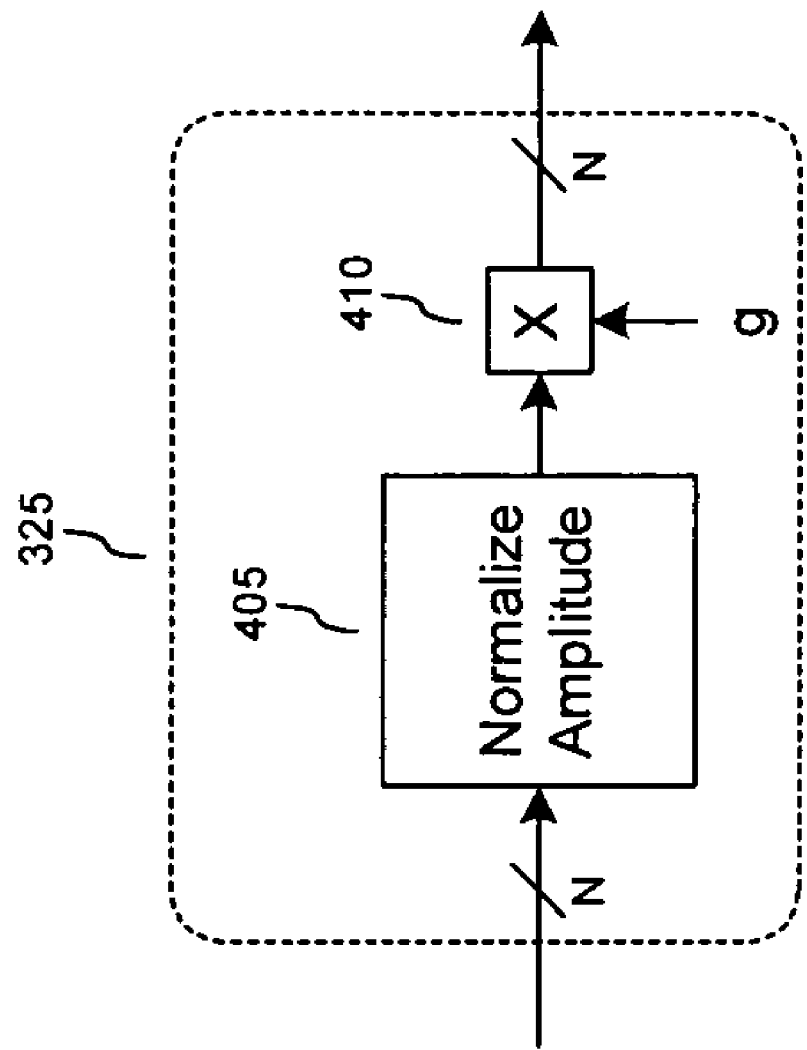
FIG. 4 shows one embodiment for implementing the inter symbol interference (ISI) control processing of FIG. 3.

FIG. 4 shows one embodiment of the ISI control (325) block shown in FIG. 3. The block implements two processing steps. First, the input N length symbol set is normalized (405) to unity amplitude. The phase of the symbols is preserved during this amplitude normalization (405). By normalizing the amplitude of every symbol, the resulting set of symbols will all induce an identical amount of inter-symbol interference (ISI) to the final OFDM modulator signal output. The level of induced ISI is then adjusted by multiplying (410) the entire N-length set of normalized (405) symbols by a gain constant g. By setting g to zero, no crest factor reduction is applied. Increasing gain will both increase the amount of crest factor reduction while increasing the amount of ISI. One should note however that the peak power would never be reduced beyond the clipping level L (310, FIG. 3).

Another embodiment, (not shown) would be to forgo the normalization (405, FIG. 4). The gain step would still control the ISI level, but the ISI level would also be dependent on the amplitude of symbols exiting the DFT block (320). In systems that permit large peak ISI, such an ISI control embodiment may be acceptable.

Figure 5:
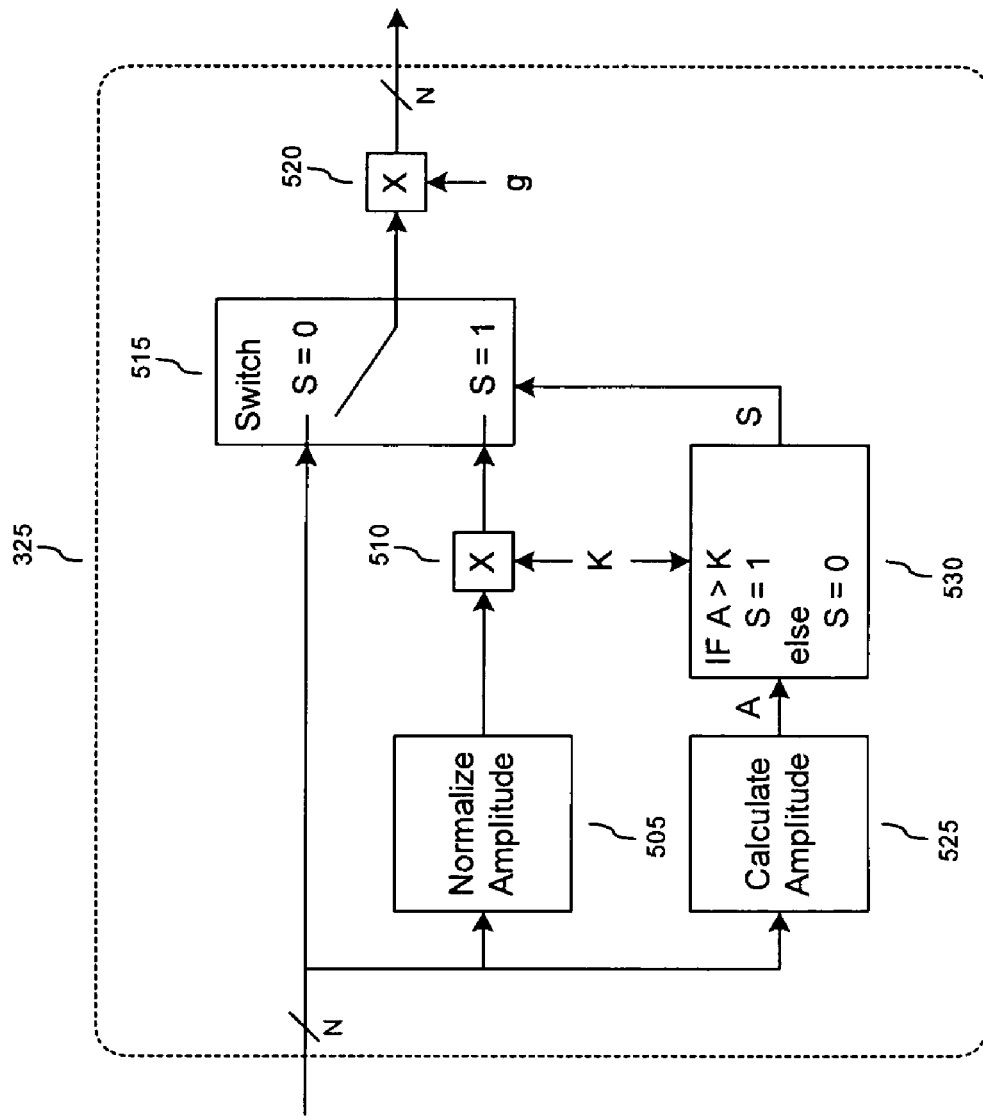
FIG. 5 shows another embodiment for implementing the inter symbol interference (ISI) control processing of FIG. 3.

FIG. 5 shows an alternate embodiment of the ISO control block (325), where only large symbols are normalized. The embodiment of FIG. 5 has two symbol paths and one control path. One symbol path is unprocessed, the other path includes symbol normalization (505) processing. The output of the normalization (505) is multiplied (510) by a gain value K determined by the user. The value K is also used to switch between the unprocessed path and the normalized path. The unprocessed path is selected when amplitudes are less than or equal to K and the processed path is selected when the amplitudes are above K. The control path includes an amplitude calculator (525), and conditional block (530), and a switch (515). Finally, the output of the switch (515) is multiplied by a gain constant G. The values of K and G determine the peak level of ISI induced by CFR in OFDM signal generation. Unlike the embodiment shown in FIG. 4, the ISI induced by FIG. 5 will very from symbol to symbol based on the value of K. For symbols input to the CFR block that are less than K, the ISI induced will be less. Most data communication systems include error correction encoding and interleaving. If some symbols have less ISI, this encoding and interleaving may be more successful in recovering data corrupted by CFR. Also, in the embodiment shown in FIG. 4, the induced ISI is identical for all transmitted symbols. For the embodiment of FIG. 5 the peak ISI induced can be set to the same level as that set in FIG. 4 using the relationship g=G/K. Additional embodiments of the ISI block (325) are possible.

FIG. 5 operates on complex data limiting ISI based on signal amplitude. An additional embodiment (not show) would operate independently on the amplitude of the real and imaginary components of the input signal. Such an embodiment would be obvious to those skilled in the art.

The foregoing embodiments are purely illustrative in nature and a number of detailed implementations and variations may be provided. For example, the circuit blocks may be implemented in discrete circuits such as one or more ASICs, in one or more high speed suitably programmed processors, or a combination thereof. Additional variations based on the specific applications will be appreciated by those skilled in the art.

What is claimed is:

1. A method for peak power reduction of an OFDM wireless communication signal, comprising:
  receiving an OFDM signal comprising plural symbols;
  splitting the OFDM signal along first and second parallel signal paths;
  performing a peak reduction processing on the signal in the second signal path in the time domain to derive a peak reduction signal;
  converting the peak reduction signal into the frequency domain;
  performing a processing in the frequency domain to adjust the amount of inter-symbol interference introduced by said peak reduction processing to provide an inter-symbol interference adjusted peak reduction signal; and
  combining the inter-symbol interference adjusted peak reduction signal with the signal on the first signal path to provide a peak power adjusted OFDM signal;
  wherein performing a processing in the frequency domain to adjust an amount of inter-symbol interference comprises converting the peak reduction signal from the time domain to the frequency domain and normalizing the magnitude of the peak reduction signal.

2. A method for peak power reduction of an OFDM wireless communication signal as set out in claim 1, wherein said peak reduction processing comprises clipping signals above a threshold value and taking the difference between the clipped and unclipped symbols to derive said peak reduction signal.

3. A method for peak power reduction of an OFDM wireless communication signal as set out in claim 2, wherein the signal provided on said second signal path by said splitting comprises a frequency domain signal and wherein said peak reduction processing further comprises converting said frequency domain signal to the time domain before said clipping.

4. A method for peak power reduction of an OFDM wireless communication signal as set out in claim 1, wherein combining the inter-symbol interference adjusted peak reduction signal with the signal on the first signal path to provide a peak power adjusted OFDM signal comprises subtracting said inter-symbol interference adjusted peak reduction signal from said signal on the first signal path.

5. A method for peak power reduction of an OFDM wireless communication signal as set out in claim 1, wherein normalizing the magnitude of the peak reduction signal is performed selectively on a symbol by symbol basis based on the magnitude of the peak reduction signal, wherein only symbols exceeding a predetermined value are normalized.

6. A method for peak power reduction of an OFDM wireless communication signal as set out in claim 1, wherein normalizing the magnitude of the peak reduction on a symbol by symbol basis further comprises multiplying the normalized symbols by said predetermined value.

7. A method for peak power reduction of an OFDM wireless communication signal as set out in claim 1, wherein performing a processing in the frequency domain to adjust an amount of inter-symbol interference further comprises multiplying the magnitude of the normalized peak reduction signal by a gain factor.

8. A method for peak power reduction of an OFDM wireless communication signal as set out in claim 1, further comprising band limiting said inter-symbol interference adjusted peak reduction signal before combining the inter-symbol interference adjusted peak reduction signal with the signal on the first signal path.

9. An OFDM communications system, comprising:
   an input receiving a modulated communication signal comprising a series of symbols;
   a serial to parallel converter for converting the symbols into parallel format in groups of plural symbols;
   a framing circuit for framing the parallel format symbols to provide framed sets of symbols;
   a crest factor reduction circuit comprising first and second parallel signal paths both receiving said framed sets of symbols, said second signal path including a circuit for converting the framed sets of symbols into the time domain, a peak reduction circuit performing a peak reduction processing on the time domain symbols to derive sets of peak reduction symbols, a circuit for converting the peak reduction symbols into the frequency domain, and an inter-symbol interference control processing circuit operating on the frequency domain peak reduction symbols to adjust an amount of inter-symbol interference introduced by said peak reduction symbols to provide inter-symbol interference adjusted peak reduction symbols, said crest factor reduction circuit further comprising a combiner circuit for combining the inter-symbol interference adjusted peak reduction symbols with the symbols on the first signal path to provide peak reduced sets of symbols in the frequency domain;
   a circuit for converting the peak reduced sets of symbols into the time domain;
   a cyclic extension circuit for performing a cyclic extension operation on the time domain peak reduced symbols;
   a windowing circuit for performing a windowing operation on the time domain peak reduced symbols; and
   a parallel to serial converter for converting the time domain peak reduced symbols from parallel to serial format to provide a peak power reduced digital OFDM communication signal;
   wherein said inter-symbol interference control processing circuit comprises a normalization circuit which adjusts the magnitude of the peak reduction symbols.

10. An OFDM communication system as set out in claim 9, wherein said circuit for converting the framed sets of symbols into the time domain and said circuit for converting the peak reduced sets of symbols into the time domain each comprise an inverse direct Fourier transform circuit block and wherein said circuit for converting the peak reduction symbols into the frequency domain comprises a direct Fourier transform circuit block.

11. An OFDM communication system as set out in claim 9, wherein said normalization circuit adjusts each peak reduction symbol in a set to the same magnitude.

12. An OFDM communication system as set out in claim 9, wherein said normalization circuit adjusts each peak reduction symbol on a symbol by symbol basis based on symbol magnitude.

13. An OFDM communication system as set out in claim 9, wherein said inter-symbol interference control processing circuit further comprises a multiplier which multiplies the normalized peak reduction symbols by a constant gain factor.

* * * * *